United States Patent Office 3,076,022
Patented Jan. 29, 1963

3,076,022
MYRCENE-METHYL ISOPROPENYL KETONE
ADDUCTS, DERIVATIVES THEREOF
Garry C. Kitchens, Packanack Lake, N.J., assignor to
The Givaudan Corporation, New York, N.Y., a corporation of New Jersey
No Drawing. Filed Apr. 15, 1959, Ser. No. 806,447
7 Claims. (Cl. 260—488)

This invention relates to novel materials having desirable olfactory properties, and to a process for the preparation of such materials. More especially, the present invention relates to the preparation of Diels-Alder adducts of myrcene and methyl isopropenyl ketone and to the resulting adducts and derivatives thereof.

Myrcene is produced in commercial quantities by the pyrolysis of beta-pinene. It is a substance which occurs in various essential oils and in the dehydration products of linalool. Myrcene has the formula:

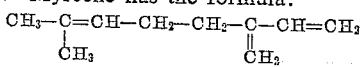

Methyl isopropenyl ketone is a material which is polymerized to form plastic materials and copolymerized with other material to form copolymers. It is also used as a chemical intermediate. It has the formula:

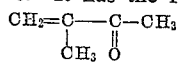

In general, in preparing the novel myrcene-methyl isopropenyl ketone adducts the diene, myrcene, is reacted with the dienophile, methyl isopropenyl ketone, according to the well-known Diels-Alder reaction. The adducts are a mixture of two structural isomers which are possible when an unsymmetrical diene and an unsymmetrical dienophile interact by the addition of the ethylene double bond of the dienophile to the 1,3-conjugated bonds of the diene. Thus, the adducts of this invention have the formulae: 1 - methyl-1-aceto-4-(isohexen-3-yl-1)-3-cyclohexene and 1-methyl-1-aceto-3-(isohexen-3-yl-1)-3-cyclohexene. In practice it has been found that the former predominates to the extent of being present in an amount of around 90% or higher of the mixture of the two isomers.

As will be understood by those skilled in the art, the other novel products of this invention will also exist in different isomeric forms. Thus, the hydrogenated adducts have the formulae:

1-methyl-1-aceto-4-isohexylcyclohexane and
1-methyl-1-aceto-3-isohexylcyclohexane.

The acid-cyclized products of the novel adducts may exist in as many as 6 isomeric forms as follows:

2,8,8-trimethyl-2-aceto-1,2,3,4,5,6,7,8-octahydronaphthalene
2,5,5-trimethyl-2-aceto-1,2,3,4,5,6,7,8-octahydronaphthalene
2,8,8-trimethyl-2-aceto-1,2,3,4,6,7,8,9-octahydronaphthalene
2,5,5-trimethyl-2-aceto-1,2,3,4,6,7,8,9-octahydronaphthalene
2,8,8-trimethyl12-aceto-1,2,3,5,6,7,8,9-octahydronaphthalene
2,5,5-trimethyl-2-aceto-1,2,3,5,6,7,8,9-octahydronaphthalene The hydrogenated acid-cyclized products of the novel adducts may exist as:

(a) 2,8,8-trimethyl-2-acetodecahydronaphthalene
2,5,5-trimethyl-2-acetodecahydronaphthalene or (b) 2,8,8-trimethyldecahydronaphthyl-2-methyl carbinol
2,5,5-trimethyldecahydronaphthyl-2-methyl carbinol.

Esters of (b) immediately above may also exist in 2 forms.

In general, in preparing the novel myrcene-methyl isopropenyl adducts, the reactants are heated together at about 85° C. to about 160° C. until the reaction is complete, which requires from about 3½ to about 24 hours, depending on the temperature used. To avoid the use of pressure equipment I prefer to begin the reaction at a temperature of about 85° C. and heat to reflux (about 130° C.). The temperature is allowed to rise to about 150° C. as the reaction proceeds and the boiling point of the mixture increases. The reaction is completed, under agitation, at about 150° C.

Unusual, and desirable odor properties have been found to characterize the aforementioned adducts as well as their hydrogenation products; the acid-cyclized products of said adducts; the hydrogenated, acid-cyclized products of said adducts; and esters of trimethyldecahydronaphthyl-2 methyl carbinols.

The hydrogenation products of the novel myrcene-methyl isopropenyl ketone adducts are prepared by the selective hydrogenation of the ethylenic bonds of said adducts, using a catalyst selective for such purpose.

Palladium on charcoal, with or without solvents, such as methanol and hydrocarbons, is an excellent catalyst for the hydrogenation. The conditions are not critical. The use of 0.5%–5.0% catalyst (5.0% palladium on charcoal) in a temperature range of 50° C.–150° C., employing 100–600 lbs. hydrogen pressure results in hydrogenation of both olefinic bonds. I prefer to hydrogenate the adducts in toluene as a solvent, using 1% by weight of 5% palladium on charcoal as catalyst at 100° C. under 200 lbs. hydrogen pressure until no more hydrogen is absorbed and 2 moles of hydrogen are consumed for each mole of adduct.

The myrcene-methyl isopropenyl ketone adducts of this invention are converted to cyclized products by subjecting the adducts to ring closure with the aid of proton donating agents, such as acids, to form the bicyclic carbonium ion, which loses the proton to form a mixture of trimethyl-2-aceto-octahydronaphthalenes.

As already noted, it will be appreciated that at least 6 possible isomers may be formed when the novel adducts of this invention are cyclized. This may be more clearly understood from the following reaction sequence, in which the predominant adduct, 2-methyl-1-aceto-4-(isohexen-3-yl-1)-3-cyclohexene is used for illustrative purposes:

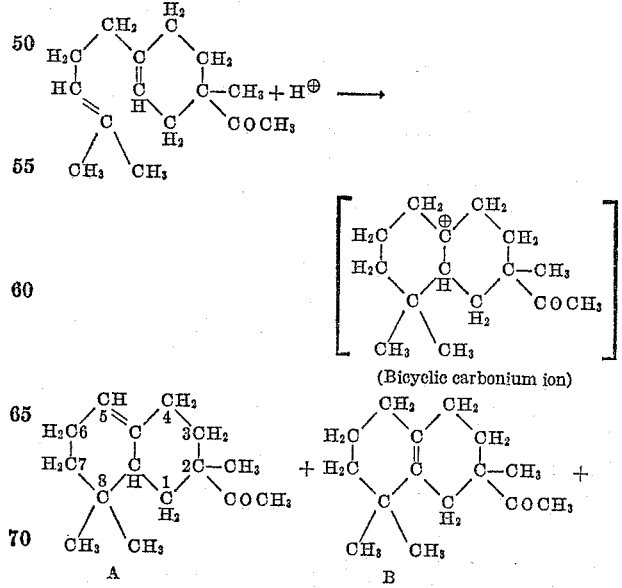

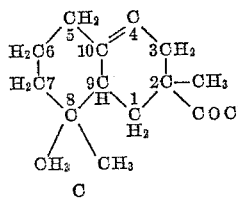

Weak proton donating agents, such as phosphoric acid and boron trifluoride lead to a mixture which is predominantly A, with a lesser amount of B and a small amount of C. Strong proton donating agents, such as sulfuric acid, lead to a mixture which is predominantly B, with a lesser amount of A and a small amount of C.

The trimethyl-2-aceto-octahydronaphthalenes are converted to the fully saturated ketones, trimethyl-2-aceto-decahydronaphthalenes, by selectively hydrogenating the ethylenic bond of the octahydro compounds, using palladium on charcoal as the catalyst.

The trimethyl-2-aceto-octahydronaphthalenes can be converted to the corresponding fully saturated carbinols, trimethyl-decahydronaphthyl-2-methyl carbinols, by hydrogenation in the presence of Raney nickel as the catalyst.

The carbinols referred to in the preceding paragraph can be converted into esters. For example, the acetates, -trimethyldecahydronaphthyl-2-methyl carbinyl acetates, are prepared by acetylating the carbinols with acetic anhydride.

The novel products of this invention can be used for compounding perfumes which can be used to scent soap, creams, toilet water and alcoholic extracts.

It is surprising that the products of this invention possess such desirable olfactory properties, in view of the fact that the homologous adducts of myrcene and methyl vinyl ketone and corresponding derivatives have no practical value as odorants.

In order further to illustrate my invention, the following examples are given:

EXAMPLE I

*Preparation of Myrcene-Methyl Isopropenyl Ketone Adducts*

Into a one liter, 3 neck flask, equipped with an agitator, thermometer, and a water separator filled with myrcene and fitted with a condenser was charged 400 g. myrcene. The batch was heated to 85° C. and 168 g. of methyl isopropenyl ketone was fed in over ½ hour period. The batch was heated to 150° C., refluxing beginning at 129° C. and required 3¾ hours to reach 150° C. The batch was heated at 150° C. for 4 additional hours, 2 cc. of water were collected in the separator.

The crude adduct was vacuum distilled, using an 8″ column packed with glass helices. The following fractions were collected:

| | | |
|---|---|---|
| 1 | 185 g. | B.P. 57–74° C./20 mm. |
| 2 | 10 g. | B.P. 43–47° C./5 mm. |
| 3 | 17 g. | B.P. 47–90° C./0.5 mm. |
| 4 | 31 g. | B.P. 90–104° C./0.5 mm. |
| 5 | 183 g. | B.P. 104–115° C./0.5 mm. |
| 6 | 13 g. | B.P. 115–135° C./0.5 mm. |
| And | 124 g. | Residue. |

Fractions 1, 2 and 3 were classified as hydrocarbons containing some ketones at no value. Fractions 4 and 6 were classified as adduct fractions assaying 80% adduct. Fraction 5 were the adduct analyzing: purity (oximation) 99.6%, Sp. Gr. 25°/25° C. 0.9292, $n_D^{20}$ 1.4868. The material has a fresh jasmin note with an undertone of ionone.

Yield:

$$\frac{183+(44\times 0.8)\times 100}{168}=129\% \text{ wt. on methyl isopropenyl ketone}$$

$$\frac{183+(44\times 0.8)\times 100}{400}=54.6\% \text{ wt. on myrcene}$$

EXAMPLE II

*Preparation of Hydrogenated Adducts of Myrcene and Methyl Isopropenyl Ketone*

| | |
|---|---|
| Myrcene-methyl isopropenyl ketone adduct (Ex. I, fraction 5) _____g\_\_ | 93 |
| Toluene _____ml\_\_ | 100 |
| Palladium (5% on charcoal) catalyst _____g\_\_ | 1 | were charged into a steel liner of a rocking autoclave and hydrogenated at 100° C. and 250 lbs. hydrogen pressure. The hydrogenation was continued until no more hydrogen was absorbed requiring 18 hours. 0.84 mole of hydrogen was absorbed.

The material was filtered free of catalyst and the toluene was removed by distillation under reduced pressure leaving a residue of 98 g. of crude material.

The crude was vacuum distilled at 1.5 mm. using an 8″ column packed with glass helices collecting the following fractions:

| | | |
|---|---|---|
| 1 | 3.0 g. | B.P. 23–25° C. |
| 2 | 1 g. | B.P. 25–110° C. |
| 3 | 3 g. | B.P. 110–115° C. |
| 4 | 86 g. | B.P. 115–121° C. |
| 5 | 5 g. | B.P. 121–123° C. |
| And | 0.5 g. | Residue. |

Fraction 1 was classified as lights (toluene). Fractions 2, 3 and 5 were classified as fractions assaying 50% of the desired hydrogenated adducts. Fraction 4 was the desired product assaying: purity (oximation) 91.4%, Sp. Gr. 25°/25° C. 1.4595. The material possesses a fresh, fruitness jasmin note with an undertone of ionone.

Yield:

$$\frac{86+(9\times 0.5)\times 100}{93}=97.3\% \text{ wt. on myrcene-methyl isopropenyl ketone adduct}$$

EXAMPLE III

*Preparation of Trimethyl-2-Aceto-Octahydronaphthalenes*

A two liter, three neck flask equipped with an agitator, thermometer and a dropping funnel was charged with 990 g. of 62½% sulfuric acid. A mixture of 294 g. of myrcene-methyl isopropenyl ketone adduct (Ex. I, fraction 5) and 294 g. of benzene was fed in over a 15 minute period with vigorous agitation. The temperature was allowed to rise to 35° C. and agitated at 30–35° C. for 3 hours.

500 ml. of water were added and allowed to settle. The benzene-oil layer was separated and washed twice with 200 ml. portion of water, once with 50 ml. of 10% sodium bicarbonate solution and once with 100 ml. of water.

The benzene was removed by distillation under reduced pressure leaving a residue of 300 g. of crude trimethyl-2-acetooctalins.

The crude was vacuum distilled at 1 mm. using a 37 cm. column packed with glass helices and collecting the following fractions:

| | | |
|---|---|---|
| 1 | 6 g. | B.P. 70°–105° C. |
| 2 | 6 g. | B.P. 105° C. |
| 3 | 262 g. | B.P. 105°–111° C. |
| 4 | 6 g. | B.P. 111°–113° C. |

Fractions 1, 2 and 4 were bulked and assayed 80% trimethyl-2-acetooctalins. Fraction 3 was trimethyl-2-acetooctalins assaying: purity (oximation) 100%, Sp. Gr. 25°/25° C. 0.9721, $n_D^{20}$ 1.4975. The product possesses an intense ambergris-like note.

Yield:

$$\frac{262+(18+0.8)\times 100}{294}=94.1\% \text{ wt. on myrcene-isopropenyl ketone adduct}$$

EXAMPLE IV

*Preparation of Trimethyl-2-Aceto-1,2,3,4,5,6,7,8,9,10-Decahydronaphthalenes*

| | G. |
|---|---|
| Trimethyl-2-acetooctalins (Ex. III, fraction 3) | 50 |
| Toluene | 50 |
| Palladium (5% on charcoal) catalyst | 1 | were charged into a steel liner of a rocking autoclave and hydrogenated at 100° C. and 200 lbs. hydrogen pressure for 12 hours. 0.23 mole of hydrogen being absorbed.

The material was filtered free of catalyst and benzene removed by distillation at atmospheric pressure leaving a residue of 49 g. of crude.

The crude was vacuum distilled at 1 mm. using a 37 cm. column packed with glass helices collecting the following fractions:

| 1 | 1 g. | B.P. 103°–104° C. |
|---|---|---|
| 2 | 42 g. | B.P. 104°–107° C. |
| 3 | 1 g. | B.P. 107° C. |
| And | 5 g. | Residue. |

Fractions 1 and 3 were classified as trimethyl-2-acetodecahydronaphthalenes assaying 90%. Fraction 2 was trimethyl-2-acetodecahydronaphthalenes, the desired material, assaying: purity (oximation) 90%, Sp. Gr. 25°/25/ C. 0.9581, $n_D^{20}$ 1.4916. The material possesses an intense ambergris-like note.

Yield:

$$\frac{42+(2\times 0.9)\times 100}{50}=87.6\% \text{ wt. on trimethyl-2-acetooctahydronaphthalenes}$$

EXAMPLE V

*Preparation of Trimethyldecahydronaphthyl-2-Methyl Carbinols*

| | G. |
|---|---|
| Trimethyl-2-acetooctahydronaphthalenes | 150 |
| Raney nickel catalyst | 10 | were charged into a steel liner of a rocking autoclave and hydrogenated at 100° C. and 200 lbs. hydrogen pressure until no more hydrogen was absorbed. The hydrogenation required 16 hours and 1.38 moles of hydrogen was absorbed.

The material was filtered free of catalyst and amounted to 147 g. of crude.

The crude was vacuum distilled at 1 mm. using an 8" column packed with glass helices and collecting the following fractions:

| 1 | 2 g. | B.P. 113° C. |
|---|---|---|
| 2 | 137 g. | B.P. 113°–117° C. |
| 3 | 1 g. | B.P. 117° C. |
| And | 5 g. | Residue. |

Fractions 1 and 3 were classified as trimethyldecahydronaphthyl-2-methyl carbinols fractions at 90% value. Fraction 2 was trimethyldecahydronaphthyl-2 methyl carbinols analyzing: purity 95.8%, Sp. Gr. 25°/25° C. 0.9714, $n_D^{20}$ 1.5072. The material possesses an intense ambrette seed note.

Yield:

$$\frac{137+(3\times 0.9)\times 100}{150}=93\% \text{ wt. on trimethyl-2-acetooctahydronaphthalenes}$$

EXAMPLE VI

*Preparation of Trimethyldecahydronaphthyl-2-Methyl Carbinyl Acetates*

| | G. |
|---|---|
| Trimethyldecahydronaphthyl - 2 methyl carbinols (Ex.V, fraction 2) | 100 |
| Acetic anhydride | 55 |
| Sodium acetate (anhydrous) | 3 | were charged into a 500 ml., three neck flask equipped with a thermometer, an agitator and reflux condenser. The batch was heated to 100° C. and agitated 5 hours at 100° C.

The material was cooled to 50° C., 100 ml. of water added and agitated ½ hour. 100 ml. of benzene was added and allowed to settle. The benzene-oil layer was separated and washed twice with 100 ml. portions of water, once with 50 ml. of 10% sodium bicarbonate solution and once with 50 ml. of water.

The benzene was removed by distillation under slightly reduced pressure leaving a residue of 130 g. of crude ester.

The crude ester was vacuum distilled at 0.3 mm. using a still head and collecting the following fractions:

| 1 | 13 g. | B.P. 108°–109° C. |
|---|---|---|
| 2 | 105 g. | B.P. 109°–117°C. |
| 3 | 8 g. | B.P. 117°–123° C. |
| And | 3 g. | Residue. |

Fractions 1 and 3 were classified as ester fractions at 80% trimethyldecahydronaphthyl-2 methyl carbinyl acetates. Fraction 2 was trimethyldecahydronaphthyl-2 methyl carbinyl acetates analyzing: purity 99.0%, Sp. Gr. 25°/25° C. 0.9790, $n_D^{20}$ 1.4841. The material possesses an intense woody musk note.

Yield:

$$\frac{105+(21\times 0.8)\times 100}{100}=121.8\% \text{ wt. on trimethyldecahydronaphthyl-2 methyl carbinols}$$

Six soap cakes were made by adding 1 g. of each of the compounds prepared in accordance with the foregoing examples to 100 g. of unperfumed white No. 1 soap flakes, and milling each with 15 g. of distilled water in a porcelain mortar until the ingredients were intimately combined. The masses of soap were then formed into cakes by pressing in a tablet-making die.

The odors proved to be strong and stable over a period of 11 months.

The compounds prepared in accordance with Examples I and II when incorporated in a perfume composition impart a rich natural jasmin note thereto. The compounds of Example III and IV when incorporated into a composition that benefits by the addition of natural ambergris (e.g., a nuguet perfumer) were found to exhibit about the same realistic smoothness, etc. as the natural ambergris exhibits. Compounds V and VI were found to be excellent fixatives when tested in a typical amber perfume and in other animal and woody perfume compositions.

The foregoing illustrates the practice of this invention, which, however, is not to be limited thereby, but is to be construed as broadly as permissible in view of the prior art and limited solely by the appended claims.

I claim:

1. A member selected from the group consisting of the Diels-Alder adducts of myrcene and methyl isopropenyl ketone; hydrogenated products of said adducts; acid-cyclized products of said adducts; hydrogenated, acid-cyclized products of said adducts; and acetates of 5,5(8,8) - dimethyl - decahydronaphthyl - 2 methyl carbinols.

2. A Diels-Alder adduct of myrcene and methyl isopropenyl ketone.

3. 1-methyl-1-aceto-4-isohexylcyclohexane.

4. 2 - methyl - 5,5(8,8) - dimethyl - 2 - aceto - octahydronaphthalene having ethylenic unsaturation in any one of the following ring positions: 4–10, 5–10 and 9–10.

5. 2 - methyl - 5,5(8,8) - dimethyl - 2 - aceto - 1,2,3,4,5,6,7,8,9,10-decahydronaphthalene.

6. 2 - methyl - 5,5(8,8) - dimethyl - decahydronaphthyl-2-methyl carbinol.

7. 2-methyl-5,5(8,8)-dimethyl-decahydronaphthyl-2-methyl-carbinyl acetate.

References Cited in the file of this patent
UNITED STATES PATENTS
2,933,506     Ohloff _____ Apr. 19, 1960

OTHER REFERENCES

Westfahl et al.: J. Am. Chem. Soc. 77, 936–939 (1955).

Mousseron-Canet et al.: Bull. Soc. Chim., France, 1956, 391–401.

Simonsen et al.: The Terpenes, vol. III, Second edition, 1952, pp. 149 and 169.